United States Patent [19]

Dahl et al.

[11] 4,389,608
[45] Jun. 21, 1983

[54] TRANSFORMERLESS BATTERY CONTROLLED BATTERY CHARGER

[76] Inventors: Ernest A. Dahl, 3247 Breaker Dr., Ventura, Calif. 93003; George H. Barry, 21225 Saratoga Hills, Saratoga, Calif. 95070

[21] Appl. No.: 306,987

[22] Filed: Sep. 30, 1981

[51] Int. Cl.³ ............................................. H02J 7/10
[52] U.S. Cl. ...................................... 320/33; 320/43; 320/48
[58] Field of Search ..................... 320/29, 31, 32, 33, 320/43, 44, 45, 46, 47, 57, 59; 323/282; 363/86

[56] References Cited

U.S. PATENT DOCUMENTS

| 3,343,066 | 9/1967 | Cribbs | 363/86 |
|---|---|---|---|
| 3,867,682 | 2/1975 | Yamauchi et al. | 320/39 |
| 3,914,679 | 10/1975 | Sullivan | 323/282 |
| 4,031,449 | 6/1977 | Trombly | 320/59 |
| 4,210,855 | 7/1980 | Harer et al. | 320/32 |
| 4,242,627 | 12/1980 | Kisiel | 320/32 |
| 4,302,717 | 11/1981 | Olla | 323/282 |

Primary Examiner—William M. Shoop
Assistant Examiner—Anita M. Ault
Attorney, Agent, or Firm—Robert F. Beers; Joseph M. St. Amand

[57] ABSTRACT

A lightweight, efficient, transformerless battery-charging system especially for use with electric vehicles, wherein a switching regulator stores only a fraction of the energy in each charging pulse, and much of the charging energy is supplied directly from the powerline and never stored in the charger. Major components include an overload and ground-fault protective current interruptor, an RF interference filter and line rectifier, and a switching regulator capable of maintaining a constant-current constant-voltage output, providing controlled input current throughout the AC cycle and including means for external shutdown.

9 Claims, 6 Drawing Figures

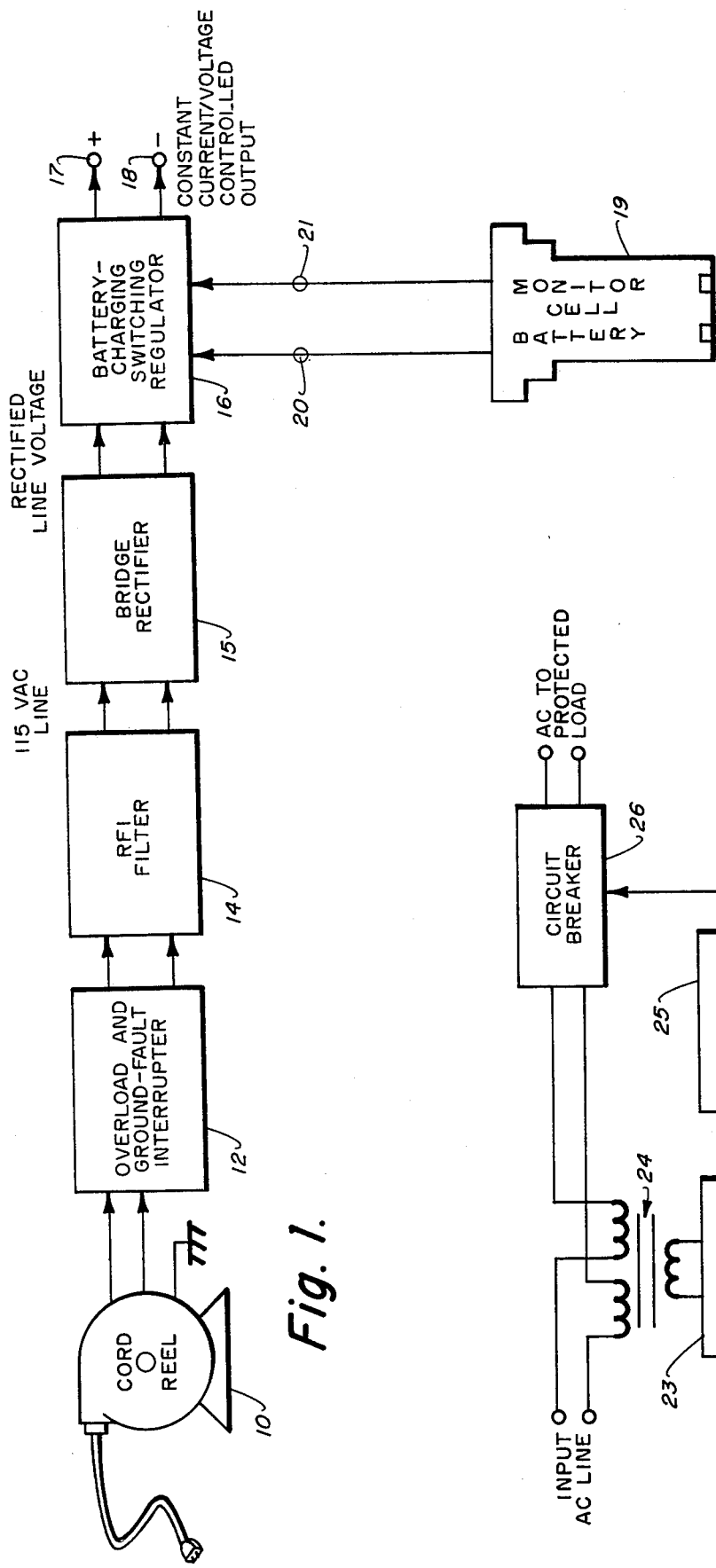

TRANSFORMERLESS BATTERY CONTROLLED BATTERY CHARGER

BACKGROUND OF THE INVENTION

The present invention relates to battery chargers and more particularly to a transformerless, battery-controlled, battery charger system intended to be carried on-board electrically-operated vehicles such as electric cars, golf carts, or light-weight industrial vehicles.

Conventional charging systems require the use of a power transformer. The conventional power transformer usually functions to isolate the DC output of a battery charger and the charged batteries from the AC power line, and/or reduces the AC line voltage to a value compatible with a vehicle battery voltage. In general, the transformer operates at the line frequency (50–60 Hz); however, in some recent designs transformers have operated at higher frequencies, typically several kilohertz, with the aid of switching-transistor choppers. This higher frequency greatly reduces the required size and weight for the transformer.

There is no absolute requirement that the battery of an electric vehicle cannot be connected directly to the AC line during charging, as is done in the present invention. Generally the electrical isolation of a power transformer is a welcome safety feature which protects the user in case he should accidentally come into simultaneous contact with the vehicle electrical system and an external ground. However, adequate protection can be provided in other ways: by insulating the vehicle electrical system; by grounding the vehicle frame with a central wire in the charging system power cables, and by including a ground fault interrupter at the charger AC line input. All three protective means are included in the present battery-charging system, and at least two, and generally all three, must fail before a user hazard can exist.

The present invention is for a transformerless, battery-charging system having three primary advantages over prior type charging systems, namely: the present system is light in weight, permitting the charging system to be carried on the vehicle with the attendant convenience of being able to recharge from any conventional AC electrical outlet; it operates at high energy efficiency, which benefits the user by reduced power consumption and cooler operation; and, it is relatively inexpensive. These advantages accrue mainly from the elimination of the power transformer required with conventional charging systems. The present battery charger is controlled from data received from all cells of the battery, providing battery-cell-controlled charging. The electrolyte levels, temperature, specific gravity and voltage are all analyzed to assure that each cell is fully charged. In the present system a switching regulator stores only a fraction of the energy in each charging pulse, and much of the charging energy is supplied directly from the powerline and never stored in the charger. Major components include an overload and ground fault protective current interruptor, an RF interference filter and line rectifier, and a switching regulator capable of maintaining a constant-current constant-voltage output, providing controlled input current throughout the AC cycle and including means for external shutdown.

Reduction of the AC line voltage to the battery charging voltage can be accomplished much more efficiently with a switching regulator than by a transformer, and this is one technique employed in the present invention. The switching regulator does require a ferromagnetic component, an inductor, but this component is much smaller and lighter than the power transformer of even a chopper-driven charger. The inductor of the switching regulator is required to store only a fraction of the energy in each charging pulse; much of the charging energy is supplied directly from the powerline source and never stored in the charger. This situation is directly analogous to the smaller size and weight of an autotransformer as compared to a conventional transformer supplying the same load. Not only is the magnetic component of the switching regulator smaller and lighter than the alternative transformer, the switching regulator can be made more efficient than a step-down transformer by varying its duty cycle through the AC line cycle in such a way as to control the input line current. Very high and quite unmanageable current pulses result from the direct application of unfiltered, rectified AC to a constant voltage load such as a storage battery.

BRIEF DESCRIPTION OF THE DRAWINGS

FIG. 1 is a block diagram of a preferred embodiment of the transformerless battery charger of the present invention.

FIG. 2 is a block diagram of a typical ground fault interrupter.

DESCRIPTION AND OPERATION

Figure 3:
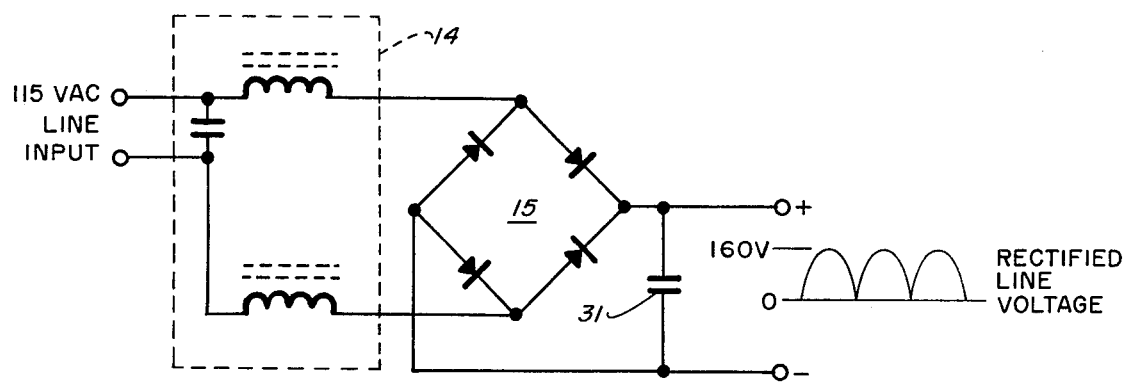
FIG. 3 shows a circuit diagram of a typical RF interference filter and bridge rectifier.

The major components of the transformerless battery charger, shown in the block diagram of FIG. 1, are a cord reel 10, an overload and ground-fault protective current interrupter 12, an RF interference filter 14, line (bridge) rectifier 15, and a switching regulator 16 capable of maintaining constant-current/constant-voltage output at the charger output terminals 17 and 18. Switching regulator 16 provides controlled input current to the battery being charged throughout the AC cycle, and includes a means of external shutdown such as remote enable input signals from battery monitoring equipment 19 which includes over-temperature sensors, over-voltage sensor, specific gravity and low-electrolyte level sensor, for example, via terminals 20 and 21. A typical monitoring device 19 for providing remote enable input signals at terminals 20 and 21 to the switching regulator 16 is described in copending U.S. patent application Ser. No. 248,639, entitled SPECIFIC GRAVITY TRANSDUCER AND BATTERY PERFORMANCE INDICATOR, filed Mar. 27, 1981 by the present inventors, now U.S. Pat. No. 4,329,406 issued May 11, 1982. This patent discloses a transducer and battery performance indicator which senses specific gravity, temperature, and electrolyte level for a battery cell; the output is in the form of electrical signal changes (e.g., yes or no signals) that are transmitted to a remote location for monitoring battery cells and/or activating acessory equipment. Such signals from this type of battery cell monitoring are used in the present transformerless battery charger as remote enable input signals at terminals 20 and 21. As indicated previously, data (i.e., electrolyte level, temperature, specific gravity and voltage) received from all the calls of the battery being charged are analyzed to assure that each cell is properly charged. The system's external shutdown control also operates as a protective means to avoid overcharging or the improper charging of overheated, low-electrolyte cells.

Specific values given in the description and drawings are merely by way of example for a typical device of this invention.

The cord reel 10, overload and ground fault interrupter 12, RF interference filter 14, and line rectifier 15 are all well known, conventional system components and little comment is needed. The cord reel 10 is provided for convenience, and if desired all the circuitry of the other components can be built into the cord reel case to make a compact charging system unit. The overcurrent and ground-fault protection can be provided either separately or combined to utilize a common current interrupting device. The block diagram of FIG. 2 shows a typical ground-fault interrupter scheme, which includes a detector 23 connected to the AC lines via transformer 24, latch 25, circuit breaker 26, input AC line terminals, and output AC terminals to the protected load. The actual current interruption has historically been performed by a fast-acting relay; however, solid-state components (triacs) are now supplanting the relay.

The circuit diagram of FIG. 3 shows a typical RF interference filter and bridge rectifier circuit, and performs the operations of RFI filter 14 and bridge rectifier 15 shown in FIG. 1. The output capacitor 31 in this circuit is selected to be only large enough to provide a low impedance for the switching regulator load: capacitor 31 is internationally not so large a value as to peak detect the AC line, because this would require a very large and expensive capacitor and, further, would result in large line current pulses as the capacitor charged at the line voltage peaks.

Figure 4:
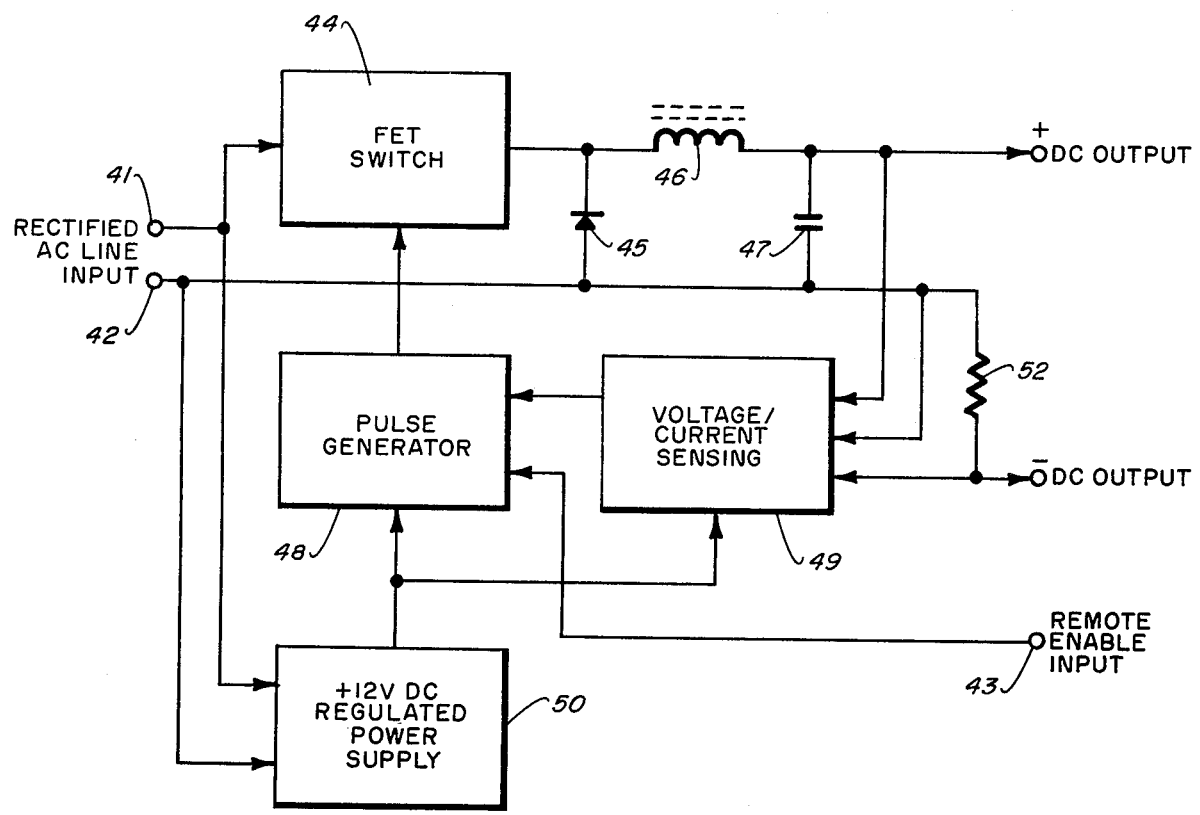
FIG. 4 is a block diagram of the current-and-voltage-controlled battery charging switching regulator.

A block diagram of the current-and-voltage controlled battery charging switching regulator 16 is shown in FIG. 4. The rectified line voltage from rectifier 15 is fed to the input of the switching regulator at terminals 41 and 42. A field effect transistor (FET) switch 44 is shown, although a bipolar transistor switch could also be used instead. Often this switch is implemented using a number of switching devices in parallel to achieve the required high current capability. Diode 45, connected between the output of FET switch 44 and input terminal 42, is able to handle a peak current of about twice the average DC charger output. The value of inductor 46 is determined by the switching rate and the output current rating; it will typically be in the 10–100 $\mu$Hz range for switching rates in the 10–20 kHz range for an average output current of 30 amperes. Under the same conditions the value of the output filter capacitor 47 will typically be several hundred $\mu f$.

The switching transistor(s) 44 must be driven by pulses from a pulse generator 48 controlled by the load. The pulse duration is varied throughout the AC line cycle in such a manner as to achieve a high current duty-cycle and to hold the DC output within the desired current and voltage limits. The output voltage-and-current-sensing circuit 49, and the pulse generator circuitry 48, both require a regulated power supply 50 (e.g., plus 12 V DC). This can be implemented, as shown, by resistively dropping the rectified line voltage across a series resistor 52, in which the value of the series resistance is a function of current, or, more conveniently, by means of a transformer-coupled supply, not shown, from the AC line directly. In either case the power requirements are negligible compared with the charging power. Means are provided within pulse generator 48 for disabling the output pulses to FET switch 44 in the absence of the remote "enable" input signal at 43 from the protective, aforementioned battery monitoring equipment, not shown. Each battery cell is provided with a condition sensor which provides enable signals to control the switching regulator.

Figure 5:
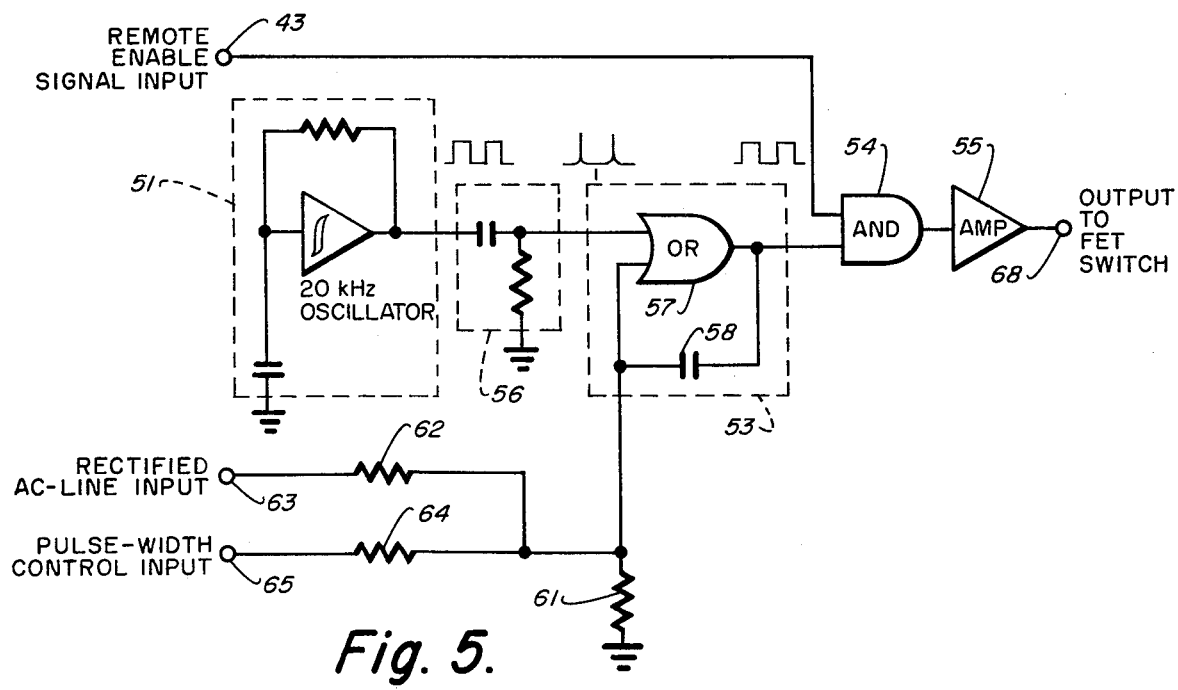
FIG. 5 shows a circuit diagram of a pulse generator as used in FIG. 4.

In FIG. 5 is illustrated a typical circuit diagram for the pulse generator 48 shown in FIG. 4. Pulse generator 48 consists of a 20 kHz oscillator 51, for example, a pulse-width modulator circuit 53, a pulse-gating circuit 54, and a pulse amplified 55.

The oscillator 51, as shown, operates continuously and is implemented with an integrated-circuit inverting schmitt-trigger. The output from the schmitt-trigger is fed back to its input through an R-C integrator circuit. Operation is as follows: When the schmitt output is at the logic-high state the integrated voltage at the schmitt input is increasing and, when this voltage reaches the schmitt high-trigger level, the schmitt output switches to the logic-low state, whereupon the integrated signal at the schmitt input begins to decrease until it reaches the schmitt low-trigger level, at which point the output switches back to the logic-high state and the process repeats. Any of many other oscillator circuits could be used equally well to produce a 20 kHz pulse stream.

The 20 kHz pulse stream is differentiated in an R-C network 56 to produce brief trigger pulses which are stretched to the pulse-width modulator circuit 53. The pulse width modulator circuit 53 is shown consisting of an OR gate 57 with capacitor 58 feedback. Each brief input pulse to the OR gate 57 produces an output pulse whose length is proportional to the time required for the feedback capacitor 58 to discharge through the three resistors shown, resistor 61 connecting to ground, resistor 62 connecting to the rectified AC-line input 63 from power supply 50, FIG. 4, and resistor 64 connecting to the pulse-width control input 65 from voltage/-current sensing circuit 49. Any of many alternative pulse-width modulator schemes could be equally-well employed to produce pulses with length proportional to the two controlling inputs.

The variable-length pulses from the pulse-width modulator 53 are shown applied to the AND gate 54 which permits the pulses to pass only when the second input to the AND gate, i.e., the remote-enable signal input 43, is high.

The width-modulated gated pulses are then amplified by pulse amplifier 55 to a voltage level consistent with the requirements of the FET switching circuit 44 connected at terminal 68.

Figure 6:
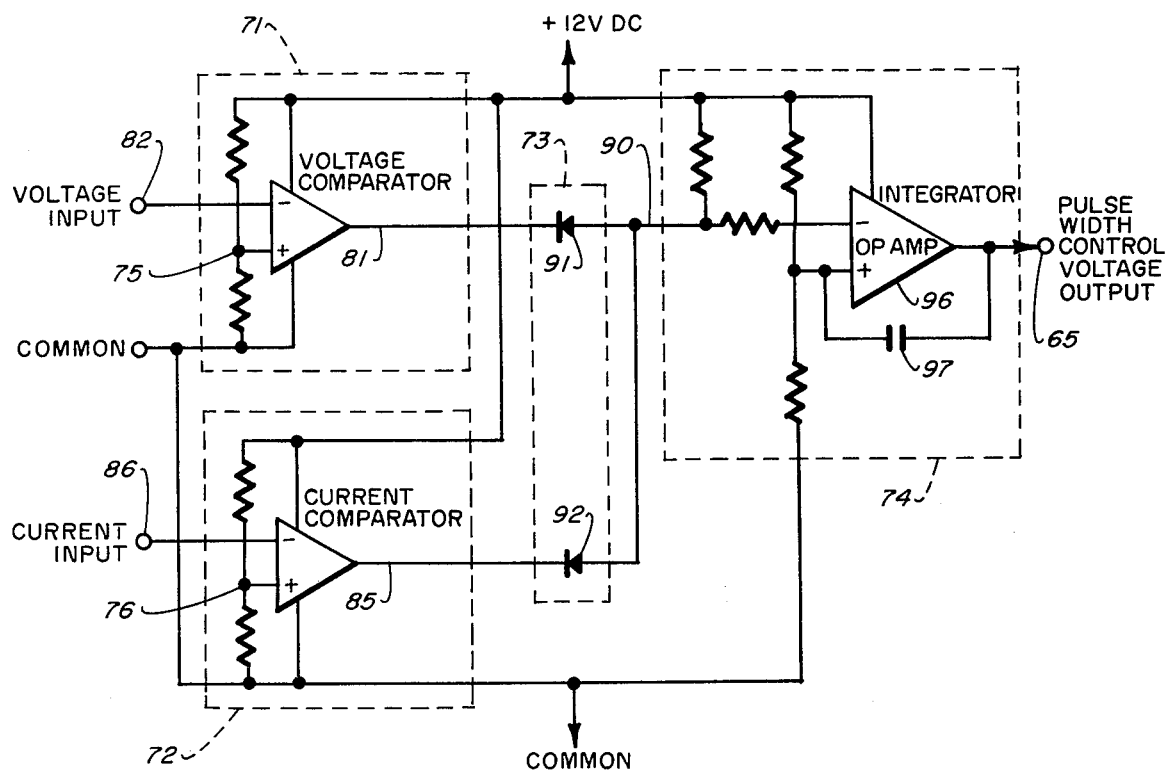
FIG. 6 shows a circuit diagram for voltage/current sensing as used in FIG. 4.

FIG. 6 shows a schematic diagram for the voltage/-current sensing circuit 49 of FIG. 4. Voltage/current sensing circuit 49 consists of a voltage-comparator circuit 71, a current-comparator circuit 72, a combining circuit 73, and an integrator circuit 74.

The voltage-comparator circuit 71 and the current-comparator circuit 72 can be identical except for the values of the reference voltages 75 and 76 which are shown in FIG. 6 to be set by the resistive divider circuits at the comparator inputs. The voltage-comparator circuit 71, typically an integrated circuit, produces a logic-high output signal at 81 when the voltage input 82 is lower than the reference voltage at 75 from the resistive divider, and a logic-low output signal at 81 when the voltage input 82 exceeds the reference voltage 75. The input shown as "current input" is actually also a voltage signal derived across the current-metering resistor (i.e., resistor 52, FIG. 4); the output at 85 from the current comparator 72 is thus logic-high when the current input 86 is lower than the reference value at 76 and is logic-low when the current output is higher than the reference value 76.

If either the voltage input 82 or the current input 86 is excessive, then one of the comparator outputs will be logic-low and the output at 90 from the combining circuit 73, consisting of the two diodes 91 and 92, will also be low. This will cause the output 65 of the integrator 74, comprising an operational amplifier 96 and feedback capacitor 97, to decrease and ultimately reduce the width of the pulses from the pulse generator (48 FIG. 4), causing the output current from the charger to decrease. Alternatively, if both the voltage and current signals, 81 and 85, are lower than their respective reference signals 75 and 76, then the combined comparator outputs at 90 will be high and the integrator output 65 will rise, ultimately restoring the desired charger output, at terminals 17 and 18, FIG. 1.

Much higher efficiencies in conversion of the AC to DC, and minimum losses in power reduction from 117 volts AC to DC level are provided by the above described battery charging system. The device can be built as a very compact unit of much lower weight than prior devices since the need for transformers is reduced. Since the charging requirement of each battery is programmed either by preprogramming or by battery monitoring probes which permit higher-speed, constant current charging, pulse charging, and temperature control of batteries, a much higher efficiency of operation is provided. The elimination of a power transformer and other components rated to the required load, allows lower costs.

Obviously, many modifications and variations of the present invention are possible in the light of the above teachings. It is therefore to be understood that within the scope of the appended claims the invention may be practiced otherwise than as specifically described.

What is claimed is:

1. A transformerless battery-controlled battery charging system, comprising:
    a. an AC power supply for providing an AC line input to the charging system;
    b. an RFI filter means connected in series with said AC line input;
    c. an overload and ground-fault current interruptor means connected between said AC line input and said RFI filter means for providing user protection;
    d. a rectifier means connected in series with the output from said RFI filter means;
    e. current-and-voltage controlled battery charging switching regulator means connected to the rectified line voltage output from said rectifier means being operable for reducing the AC line voltage and for providing a constant-current/constant-voltage output throughout each AC cycle as required for the load formed by a battery being charged; said switching regulator means including an inductor which operates to store only a fraction of the energy in each charging pulse from each RC cycle with much of the battery charging energy being supplied directly from said AC power supply and not stored in the charging system; the switching regulator duty cycle being varied through each AC cycle to control input line current;
    f. a remote enable input signal means which includes a battery cell monitoring means for sensing temperature, specific gravity, voltage, and electrolyte level conditions of each of the cells of the battery being charged;
    g. said remote enable input signal means also being connected to said switching regulator means for providing external shutdown control in response to battery cell condition sensing signals from said battery cell monitoring means, as to any of over-temperature, over-voltage, required specific gravity, and low-electrolyte level;

wherein the requirement of each battery being charged is provided by said remote enable input signal means with sensing signal data received from all cells of the battery to provide higher-speed, constant current charging with a transformerless charging system.

2. A battery charging system as in claim 1 wherein an output capacitor, the value of which is such as not to peak-detect the AC input, is provided at the output of said rectifier means.

3. A battery charging system as in claim 1 wherein said current-and-voltage controlled battery switching regulator means comprises:
    a. first and second input terminals connected to the rectified line voltage output from said rectifier means;
    b. first and second output terminals for providing constant charging current and voltage to the load of the battery being charged;
    c. a switch means connected to the first of said input terminals;
    d. a diode connected between the output of said switch means and said second input terminal;
    e. an inductor connected between the output of said switch means and said first output terminal;
    f. a filter capacitor connected between said first output terminal and said second input terminal;
    g. a pulse generator means, having a control input from the battery charger load and the remote enable input signals derived from the cell monitoring means, being connected to said switch means, whereby the pulse duration from said pulse generator means is varied throughout the AC line cycle so as to achieve a high current duty cycle and the DC output to the load is held within desired current and voltage limits.

4. A battery charging system as in claim 3 wherein said switch means is a transistor FET switch.

5. A battery charging system as in claim 3 wherein said pulse generator means comprises an oscillator means, a pulse width monitor circuit connected to said oscillator means and a pulse amplifier connected to the output of said pulse width monitor circuit whereby output pulses from said pulse generator provide pulses for controlling said switching means.

6. A battery charging system as in claim 3 wherein said pulse generator means is provided with a control input from the battery charger load by means of an output voltage and current sensing circuit.

7. A battery charging system as in claim 6 wherein said output voltage and current sensing circuit is connected across the current charging load formed by the battery being charged.

8. A battery charging system as in claim 7 wherein said output voltage and current sensing circuit comprises:
   a. a voltage comparator circuit;
   b. a current comparator circuit;
   c. a combining circuit connected to the outputs of said voltage and current comparator circuits; and,
   d. an integrator circuit connected to the output of said combining circuit;
   e. said integrator circuit operating such that when either the input to said voltage comparator circuit or said current comparator circuit is excessive one of their outputs will be logic-low resulting in a low output from said combining circuit causing the output of the integrator circuit to decrease and ultimately causing the width of the pulses from the pulse generator means to be reduced, and alternatively when both the input signals to said voltage comparator and current comparator circuits are low a high output from said combining circuit will result and the output of said integrator circuit will rise ultimately restoring the charger output.

9. A battery charging system as in claim 8 wherein the width modified pulses from said integrator circuit output are amplified by a pulse amplifier and fed to said pulse generator.

* * * * *